US010033600B2

(12) United States Patent
Hall et al.

(10) Patent No.: US 10,033,600 B2
(45) Date of Patent: *Jul. 24, 2018

(54) CLIENT APPLICATION INTEGRATION FOR WORKFLOWS

(71) Applicant: Microsoft Technology Licensing, LLC, Redmond, WA (US)

(72) Inventors: Gabriel J. Hall, Woodinville, WA (US); JongHwa Lim, Seoul (KR); Chetan Dandekar, Seattle, WA (US); TaeSuk Yoon, Seoul (KR); Seung Wook Son, Seoul (KR)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/933,823

(22) Filed: Nov. 5, 2015

(65) Prior Publication Data
US 2016/0057033 A1 Feb. 25, 2016

Related U.S. Application Data

(63) Continuation of application No. 13/351,938, filed on Jan. 17, 2012, now Pat. No. 9,208,122.

(51) Int. Cl.
*G06F 15/16* (2006.01)
*H04L 12/26* (2006.01)
(Continued)

(52) U.S. Cl.
CPC ............ *H04L 43/045* (2013.01); *G06F 15/16* (2013.01); *G06Q 10/06* (2013.01); *G06Q 10/0633* (2013.01); *G06Q 10/103* (2013.01); *H04L 51/18* (2013.01); *H04L 51/30* (2013.01); *H04L 67/06* (2013.01); *H04L 67/10* (2013.01); *H04L 67/42* (2013.01)

(58) Field of Classification Search
CPC ......... H04L 67/06; H04L 67/42; H04L 51/18; H04L 5/30; G06Q 10/06; G06F 15/16
See application file for complete search history.

(56) References Cited

U.S. PATENT DOCUMENTS 6,574,009 B1   6/2003  Ohtsuka
7,853,959 B2 * 12/2010 Agassi ................. G06Q 10/06
                                                709/203

(Continued)

OTHER PUBLICATIONS

"Final Office Action Issued in U.S. Appl. No. 13/351,938", dated May 20, 2014, 15 Pages.

(Continued)

*Primary Examiner* — Yves Dalencourt

(57) ABSTRACT

A method for providing client application integration for workflow management includes receiving a verification file, accessing a file through a client application, determining, based on the verification file, whether the accessed file includes a reference to a workflow component of a workflow stored on a server, retrieving the workflow component from the server, and displaying the workflow component referenced by the accessed file via an in-line user interface of the client application, further including displaying at least one selectable workflow management option for managing the workflow component using the client application.

20 Claims, 14 Drawing Sheets

(51) Int. Cl.
  *H04L 29/06* (2006.01)
  *G06Q 10/10* (2012.01)
  *G06Q 10/06* (2012.01)
  *H04L 29/08* (2006.01)
  *H04L 12/58* (2006.01)

(56) References Cited

U.S. PATENT DOCUMENTS

| | | | |
|---|---|---|---|
| 9,208,122 B2 * | 12/2015 | Hall | G06F 15/16 |
| 2006/0069596 A1 | 3/2006 | Hatoun et al. | |
| 2006/0069605 A1 | 3/2006 | Hatoun | |
| 2008/0082929 A1 | 4/2008 | Stignani et al. | |
| 2009/0183063 A1 | 7/2009 | Malkin et al. | |
| 2009/0204897 A1 | 8/2009 | Sogge et al. | |
| 2009/0240553 A1 | 9/2009 | Sato | |
| 2009/0319602 A1 | 12/2009 | Stevenson et al. | |
| 2010/0088133 A1 * | 4/2010 | Cina | G06Q 10/10 705/301 |
| 2010/0106681 A1 * | 4/2010 | Povzner | G06F 17/301 707/608 |
| 2010/0205616 A1 | 8/2010 | Lai et al. | |
| 2010/0241471 A1 | 9/2010 | Nylander et al. | |
| 2011/0161284 A1 | 6/2011 | Tewari et al. | |
| 2011/0314371 A1 | 12/2011 | Peterson et al. | |

OTHER PUBLICATIONS

"Final Office Action Issued in U.S. Appl. No. 13/351,938", dated Apr. 2, 2015, 14 Pages.

"Non-Final Office Action Issued in U.S. Appl. No. 13/351,938", dated Sep. 18, 2014, 12 Pages.

"Non-Final Office Action Issued in U.S. Appl. No. 13/351,938", dated Dec. 4, 2013, 12 Pages.

"Notice of Allowance Issued in U.S. Appl. No. 13/351,938", dated Aug. 6, 2015, 11 Pages.

Milner, Matt, "A Developer's Introduction to Windows Workflow Foundation (WF) in .NET 4", Retrieved from <<https://msdn.microsoft.com/en-us/library/ee342461.aspx>>, Nov. 2009, 43 Pages.

U.S. Appl. No. 13/351,938, Amendment and Response filed Mar. 3, 2014, 13 pgs.

U.S. Appl. No. 13/351,938, Amendment and Response filed Aug. 18, 2014, 11 pgs.

U.S. Appl. No. 13/351,938, Amendment and Response filed Dec. 18, 2014, 13 pgs.

U.S. Appl. No. 13/351,938, Amendment and Response filed Jun. 17, 2015, 12 pgs.

* cited by examiner

FILE  MESSAGE  M2 COMMANDS
AutoLayout (Win32)
From        Home user@microsoft.com>                 Sent Thu 8/25/2011 9:28 PM
To              user
Cc
Subject     Tasks - Please review Doc Approval Tasks assigned by group\user on 8/26/2011.

Due by 1/1/0001

Approval (13) started by group\user on 8/25/2011 9:27PM
Comment:
To complete this task:
http://user08svr2/Lists/Tasks/EditForm2.aspx?ID=103

302

Save  Cancel

Edit Task

Title*         [Please review Doc Approval]

Predecessors    | A change has been r |  [Add >]
                | A change has been r |  [<Remove]
                | A change has been r |
                | aaaa                |
                | AAACustomCT1        |
                | approval task1      |
                | default task1       |
                | Disposition approval|

Priority       [(2) Normal]

Save   Cancel

304

Home please approve this task

Edit Task — 402

Title* | Please review test666

Predecessors:
- A change has been r
- A change has been r
- A change has been r
- aaaa
- AAACustomCT1
- approval task1
- default task1
- Disposition approval Add >
< Remove Save    Cancel Task assigned by group\user on 8/23/2011.
Due by 1/1/0001
For MOE Test started by group\user on 8/22/2011 10:45 PM
Comment:

To approve this task :
http://user08svr2/Lists/Tasks/EditForm2.aspx?ID=96 — 404

CLIENT APPLICATION INTEGRATION FOR WORKFLOWS

CROSS-REFERENCE TO RELATED APPLICATIONS

This application is a continuation application of U.S. patent application Ser. No. 13/351,938, entitled "CLIENT APPLICATION INTEGRATION FOR WORKFLOWS," filed on Jan. 17, 2012, the entire disclosure of which is hereby incorporated herein by reference.

BACKGROUND

Workflows are computer-implemented representations of real world processes. Workflows assist users with collaboration on documents and management of project tasks by implementing specific processes on documents and items. Workflows also assist organizations with adherence to consistent business processes, and improve organizational efficiency and productivity by managing the tasks and steps involved in specific business processes. It is with respect to this general environment that embodiments of the present disclosure are directed.

SUMMARY

A workflow system and method providing client-application integration of workflow management and processing is disclosed. Workflows or workflow components stored on a server may be accessed through a client application for processing. One or more workflow components may be activated and presented to a client application upon verification that an accessed file includes one or more workflow components. Modifications to the workflow made within the client application may be saved to the server to update the workflow according to the modification.

An embodiment includes a method for providing client application integration for workflow management and processing. The method may include receiving a verification file; accessing a file through a client application; determining, based on the verification file, whether the accessed file includes a reference to a workflow component of a workflow stored on a server; retrieving the workflow component from the server; and displaying the workflow component referenced by the accessed file via an in-line user interface of the client application, further including displaying at least one selectable workflow management option for managing the workflow component using the client application.

In another embodiment, a system for providing client application integration for workflow management and processing is disclosed. The system includes at least one processor; a memory, operatively connected to the at least one processor and containing instructions that, when executed by the at least one processor, comprise a client application configured to: compare at least a portion of an accessed file with a verification file received from a server to determine whether the accessed file includes a reference to a workflow component; retrieve the workflow component from the server; and display the workflow component referenced by the accessed file via an in-line user interface, the accessed file including at least one selectable workflow management option for managing the workflow action using the client application.

A computer-readable medium comprising executable instructions that, when executed by a processor, provide client integration for workflow management and processing is also disclosed. The computer-readable medium includes instructions executable by the processor for comparing file information included in at least a portion of a file accessed through a client application with a verification file received from a server, the verification file including criteria used to determine whether the accessed file includes a workflow component of a workflow stored on a server, further including parsing at least a portion of the accessed file and comparing parsed portion against the verification file to determine if the accessed file includes a reference to a workflow component; verifying a match between the compared file information and the verification file criteria; verifying that the accessed file is an eligible file for execution using the client application; activating the verification file and a workflow management extension of the client application; retrieving the workflow component from the server; and displaying the workflow component referenced by the accessed file via an in-line user interface of the client application, further including displaying at least one selectable workflow management options for managing the workflow component using the client application.

This summary is provided to introduce a selection of concepts in a simplified form that are further described below in the detailed description. This summary is not intended to identify key features or essential features of the claimed subject matter, nor is it intended as an aid in determining the scope of the claimed subject matter.

BRIEF DESCRIPTION OF THE DRAWINGS

Referring now to the drawings in which like reference numbers represent corresponding parts throughout:

FIG. 3 illustrates a user interface for workflow management via a personal data management application according to one embodiment;

FIG. 4 illustrates a user interface for workflow management via a personal data management application a according to one embodiment;

DETAILED DESCRIPTION

Embodiments of the present disclosure provide client integration for workflow management and processing.

Embodiments of the present disclosure discussed below in further detail may enable in-line workflow management and processing via a client application (e.g., a personal data management application, a rich client application, such as a document processing application or a spreadsheet processing application, etc.). To accomplish workflow management and processing via a client application, the client application may be in communication with one or more servers (e.g., an application server and/or a shared application platform server) storing workflows or workflow components. Embodiments of the present disclosure may also provide an in-line workflow management interface for processing a workflow component within the client application. Real-time updating of workflows or workflow items based on modifications received within the client application may also be provided.

Figure 1:
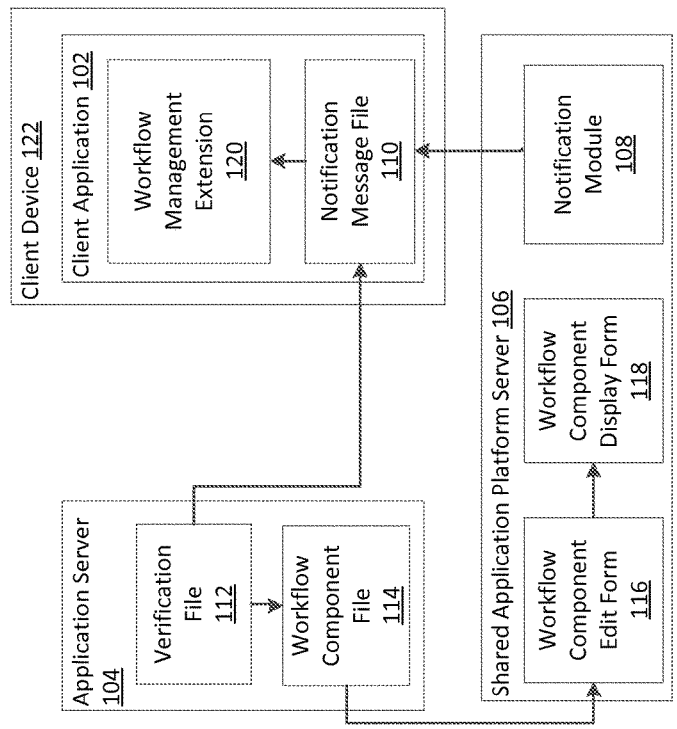
FIG. 1 illustrates the high level architecture of a system for providing client integration for workflow management and processing according to one embodiment.

FIG. 1 illustrates the high level architecture of a system 100 for providing client integration for workflow management and processing according to one embodiment. Specifically, FIG. 1 illustrates high level components 100 for accessing and processing workflow component files via a client application such as a personal data management application (e.g., Microsoft® Outlook and/or Microsoft® Outlook Web Application). System 100 may include a client application 102 in communication with application server 104 and/or a shared application platform server 106. Client application 102 may be running on a client device 122 (e.g., a computing device) and may be capable of receiving and processing notification message file 110 sent from shared application platform server 106. Shared application platform server 106 may include a notification module 108 capable of transferring a notification message file 110 (e.g., a workflow notification message file) to client application 102. For instance, an electronic message delivered to the personal data management application may include a notification message file regarding a reference to a workflow component (e.g., a task or item) of a workflow that may be processed by the client application. Workflows may initially be created using a workflow design tool such as a version of a web application such as Microsoft® SharePoint® Designer. Workflows and workflow components (e.g., items, tasks, etc.) may be stored on a shared application platform or platform server such as Microsoft® SharePoint® or a Microsoft® SharePoint® server. Workflow items may be objects to which a workflow may be associated. Workflow items may include documents, spreadsheets, presentations, etc., upon which a workflow or a workflow task may run after associating the workflow or workflow task to the workflow item. A workflow task may be a workflow item stored in a workflow task list on, for example, shared application platform. In some instances, a workflow component such as a task is associated to another workflow item stored on the shared application platform (e.g., an expense report approval task may be associated to the corresponding expense report).

Figure 2:
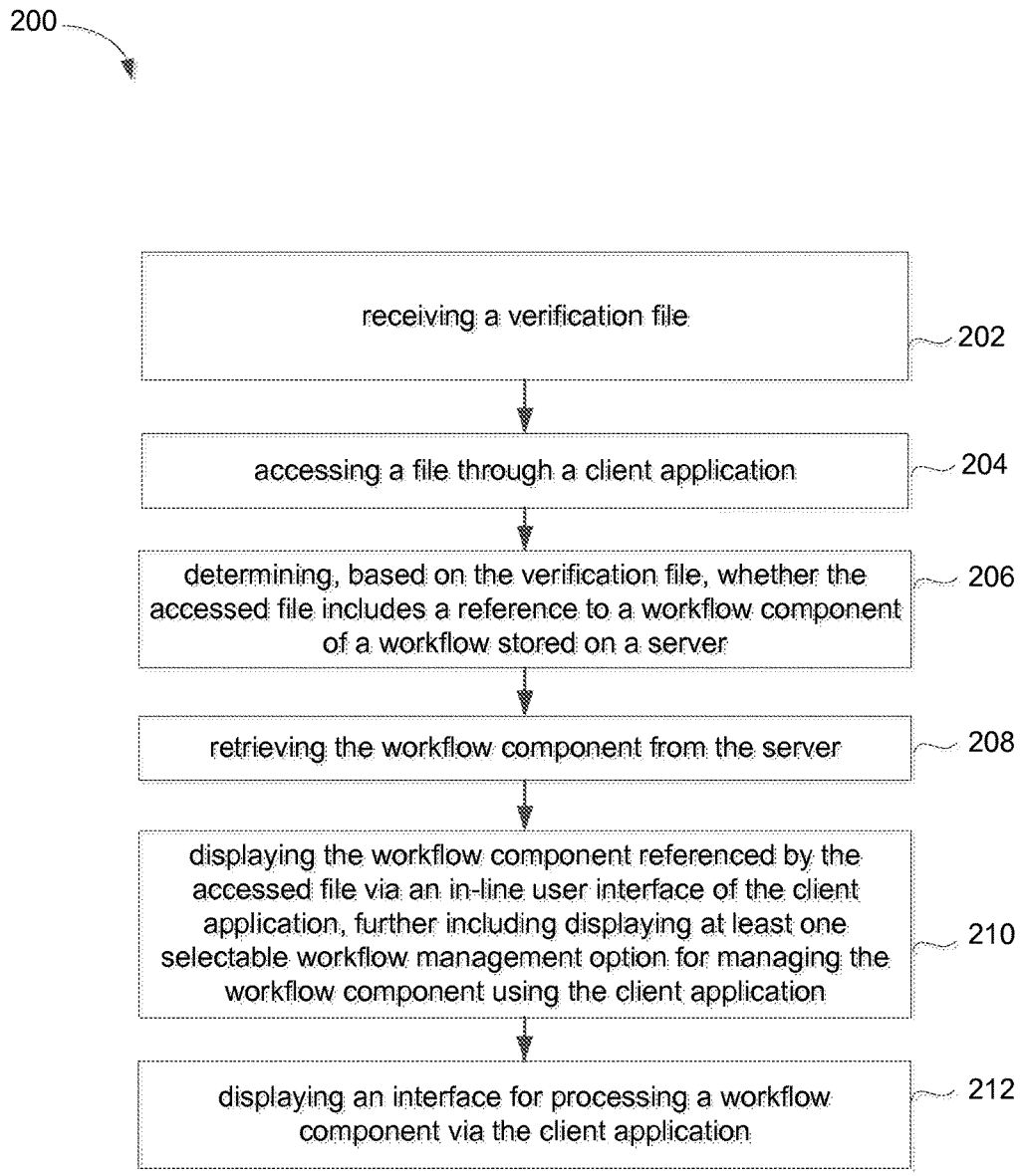
FIG. 2 is a flowchart of a method for providing client integration for workflow management and processing according to an embodiment according to one embodiment.

FIG. 2 is a flowchart of a method 200 for providing client integration for workflow management and processing according to an embodiment according to one embodiment. Method 200 may include receiving 202 a verification file from a server. Referring to FIG. 1, application server 104 may include a verification file 112 accessible by the client application 102 and usable to verify whether a file accessed via client application 102 includes a workflow component of a workflow stored, for example, on shared application platform server 106. For instance, verification file 112 may be downloaded by client application 102 from application server 104 to verify whether notification message file 110 includes a workflow component reference (e.g., a reference to a component of a workflow stored, for example, on shared application platform server 106). Application server 104 may store at least two files, verification file 112 and workflow component file 114 for processing a notification message file. Verification file 112 may be a manifest file that points to, for example, a web page defined by the shared application platform server 106. Verification file 112 may be written in XML or some other mark-up language, or can be written in other languages. Verification file 112 may be downloaded by the client application 102 upon instantiation of the client application 102 or otherwise. According to embodiments of the disclosure, a workflow component type may be specifically coded into the verification file. Any suitable workflow component type may be coded into the verification file 112 to allow for identification of workflow components using the verification file 112. Workflow component file 114 may be an html file that, upon selection, may direct a user to a workflow component stored on shared application platform server 106 (e.g., a workflow task file such as "workflowtask.htm").

Verification file 112 may include data that verifies whether the notification message file 110 includes a workflow component file (e.g., a workflowtask.html file) defined in the verification file 112 (e.g., includes a file that triggers execution of workflow management extension 120 of client application 102). Verification file 112 may define one or more verification file rules for accessing a workflow component stored on shared application platform server 106 via client application 102 (e.g., a personal data management application). In one embodiment, verification file rules may be determined in shared application platform 106 (or any other server) and transferred to application server 104 for storage in verification file 112 and downloading by client application 102. Verification rules may be workflow component activation rules (e.g., rules that determine whether workflow management extension 120 should be activated). In some embodiments, verification file 112 may define a one or more rules that determine whether a notification mail includes a workflow component file (e.g., a workflow task file, for instance, "workflowtask.htm" file) and whether workflow management extension 120 should activate. For instance, a first rule may be to detect a workflow component (e.g., task) type from the accessed file header. A second rule may be to detect a workflow component form uniform resource locator (URL) within the mail body of a received notification message. Workflow component form URL may reference one or more workflow component forms (e.g., forms defining a workflow component such as workflow component edit form 116 and workflow component display form 118) stored on shared application platform server 106.

Method 200 may include accessing 204 a file through a client application. For instance, as shown in FIG. 1, client application 102 may receive notification message file 110 from the shared application platform server 106. Notification file message 108 may then be selected and viewed via client application 102. Method 200 may further include determining 206, based on the verification file, whether the accessed file includes a reference to a workflow component of a workflow stored on a server. Comparison against verification file 112 may occur within client application 102. To this end, method 200 may include verifying that the accessed file is an eligible file for execution using the client application. Upon receiving notification message file 108, client application 102 may compare notification message file 110 to verification file 112 retrieved from application server 104. Method 200 may include parsing at least one of a header or a body of the accessed file against the verification file to determine if the accessed file includes a workflow component reference. For instance, in one embodiment, a header of notification message file 110 may be parsed and header information may be compared against verification file 112 to determine if the notification message file 110 includes a workflow component reference defined within workflow component file 114. Continuing the example above, the personal data management application may parse the notification message file (e.g., a received e-mail to determine whether the notification message includes a reference to workflow component of a workflow by comparing a message component to a verification file.

Method 200 may include activating the verification file upon satisfaction of the one or more activation rules. If the activation rules are satisfied, the verification file may be activated to establish a connection to the server hosting the workflow component, and to activate workflow management extension 120. Workflow management extension 120 may then be activated to enable workflow processing within client application 102. To this end, method 200 may include retrieving 208 the workflow component from the server. For instance, if client application 102 determines that a comparison of verification file 112 and notification message file 110 results in detecting that notification message file 110 includes a workflow component such as a workflow task notification message (e.g., a message sent from shared application platform server 106 including a reference to a workflow task), verification file 112 and workflow management extension 120 may be activated, and an entry point for activating a workflow management user interface within the client application 102 may display.

Method 200 may also include displaying 210 the workflow component referenced by the accessed file via an in-line user interface of the client application, further including displaying at least one selectable workflow management option for managing the workflow component using the client application. Upon activation of workflow management extension 120, method 200 may display 212 an interface for processing a workflow component via the client application 102. In some instances, method 200 may provide an interface for workflow task processing via a personal data management application. FIGS. 3 and 4 illustrate user interfaces for workflow management via a personal data management application according to embodiments of the disclosure. FIG. 3 illustrates an example of workflow management via a stand-alone personal data management application user interface 300 according to one embodiment. User interface 300 may be configured to display a notification message file body such as an e-mail. If the e-mail includes reference to a workflow component, verification file 112 may be activated and workflow management extension 120 may determine that a link to a site (e.g., shared application platform) is available for display within client application 102, and client application 102 may present a URL representing a link to the site. As shown in FIG. 3, link 302 to the workflow component may appear within, for example, the message body of a message displayed in user interface 300 of the personal data management application. Upon selecting link 302, client application 102 may request a workflow component from application server 104 or server 106. In some instances, link 302 may be a link to a workflow task, and the notification message file 110 may be a workflow task notification message file. In further embodiments, a reference to a workflow component may be included in a notification message file header. If the verification rules are satisfied (e.g., a confirmation is provided that the message type is a workflow notification), workflow component file 114 retrieves the workflow component information from the mail header and redirects to workflow component edit form 116.

Method 200 may further include displaying 212 an interface for processing a workflow component via the client application. When a notification message file 110 (e.g., a workflow task notification message) is delivered to a personal data management application, a user of the personal data management client may access the notification message file 110 and receive an option to process the workflow component within the personal data management application. For instance, personal data management interface 300 may display the provided link (e.g., link 302 of FIG. 3) within personal data management interface 300. Personal data management interface 300 may receive a selection of a workflow component processing entry point (e.g., selection of an "Edit task" icon within the message file, such as Edit Task icon 402 shown in FIG. 4). The Edit Task function may also be defined in the verification file. Upon receiving a selection of the workflow component processing entry point, the workflow component may be retrieved from server 104 and may be displayed within a display pane of client application user interface 300. For instance, the personal data management application may load an in-line workflow component page and display the workflow component page within a display pane 304 of the personal data management interface 300. The workflow component page may reference HTML code from within the verification file. Display pane 304 including the workflow component may appear, for instance, below the personal data management messaging interface. In some instances, displayed page is linked to a shared services application storing the workflow or workflow item on which the displayed task is running. In some embodiments, a link 302 capable of executing a web-browser may also be displayed within the user interface of the personal data management application. If the personal data management application receives a selection of link 302, a web-browser displaying a workflow component may execute.

From display pane 304, a workflow component may be viewed or processed. The workflow component file 114 stored on application server 106 may retrieve workflow component information from shared application platform server 106. Within display pane 304, the appropriate workflow component processing form (e.g., workflow component edit form 116 of FIG. 1), may be downloaded to client application 102, and may display within display pane 304 to enable workflow component processing. The workflow component displaying within display pane 304 may be configured to receive an action by the user accessing the notification message file 110. For instance, a user may edit or approve a workflow task, and the task may then be updated and saved to shared application server 106. Updated workflow component may then be displayed via workflow component display form 118 when subsequently viewed or processed.

Similar processing may occur if the client application is stand-alone or web-based. FIG. 4 illustrates workflow management via a web-based personal data management application interface 400 according to one embodiment. In a web-based configuration, message parsing may be accomplished using a client side script language (e.g., javascript code). Verification of the accessed file may be accomplished as described above. Upon verification of the accessed file, a workflow management processing entry point may display. For instance, as seen in FIG. 4 an "Edit Task" 402 icon may display. Upon selection of Edit Task 402 icon, an interface for processing a workflow component page may display (such as display 304 of FIG. 3). As discussed above, in some embodiments, a link 404 capable of executing a web-browser may also be displayed within the user interface of the personal data management application. If the personal data management application receives a selection of link 404, a web-browser displaying a workflow component may execute.

Figure 5:
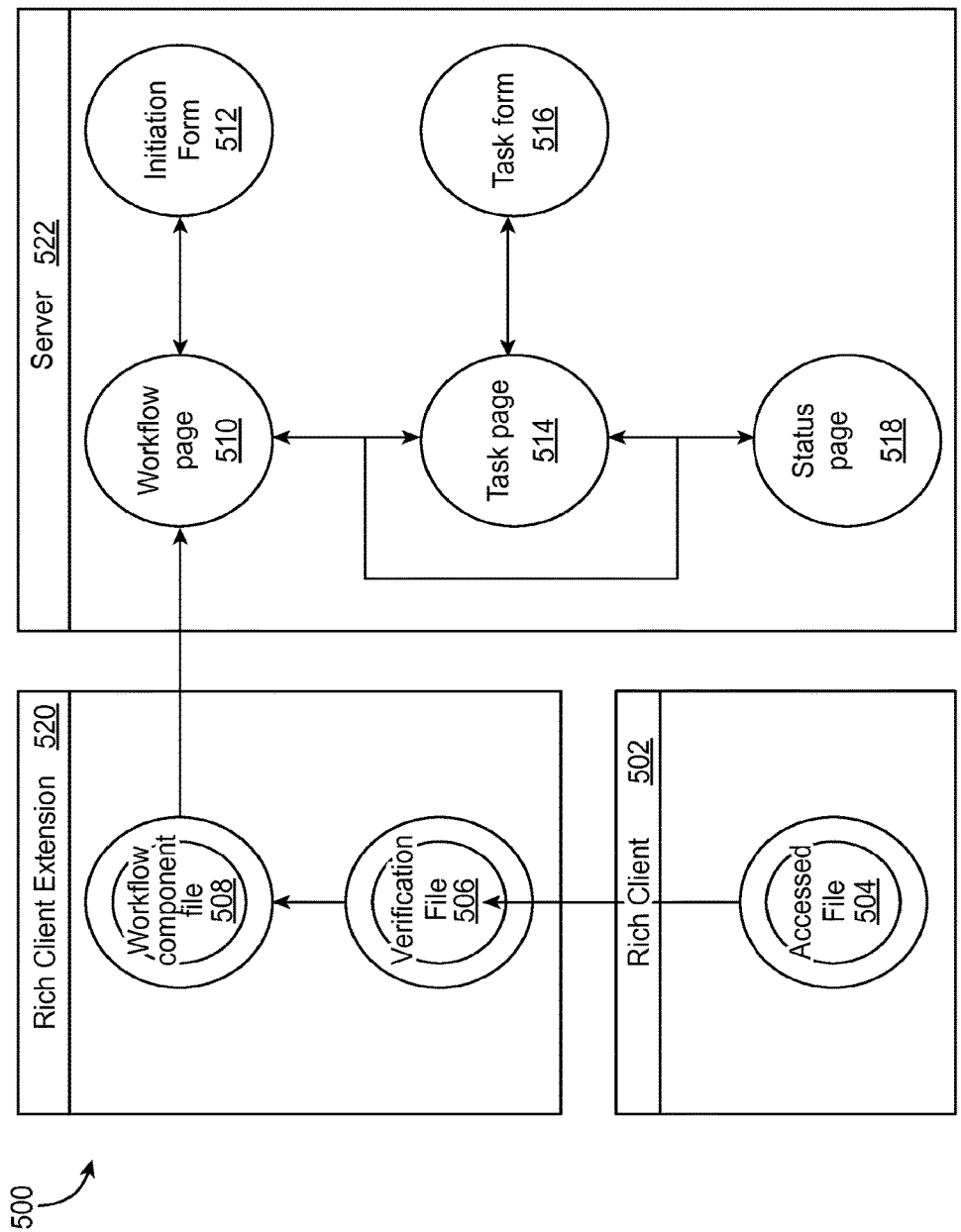
FIG. 5 illustrates system components for providing rich client integration for workflow management and processing according to one embodiment.

In some instances, method 200 may provide workflow task processing via a rich client accessing a file on which the workflow component is running FIG. 5 illustrates a system 500 for providing workflow management and processing via a client application according to one embodiment. In embodiments, FIG. 5 illustrates additional high level components for accessing and processing workflow component files via a rich client application. The accessed file may be a workflow item (e.g., document, spreadsheet, etc.) accessed from shared application platform such as Microsoft® SharePoint® storing workflows and workflow items. System 500 may include, for example, a rich client application 502, a rich client extension 520 further including a verification file 506, and a workflow component file 508, such as are described above with reference to verification file 112 and workflow component file 114 of FIG. 1, and a server 522 hosting one or more workflow component pages 510, 514, and 518, (e.g., workflow component pages that may display within the rich client application upon activation of the rich client extension) and one or more corresponding workflow forms including, for instance, a server initiation form 512 and a server task form 516. Generally, one or more workflow components may be accessible via a rich client application (e.g., Microsoft® Word, Microsoft® Excel, etc.) by implementing a rich client application extension 520, which enables interaction between rich client application 502 and server 522, for example, a shared application platform server such as shared application platform server 106 of FIG. 1. When a file including one or more workflow component references has been accessed via rich client 502, rich client extension 520 may be activated. Rich client extension may be auto-activated (e.g., upon verification that the accessed file includes one or more workflow component references) or manually activated (e.g., by receiving an activation selection by a user). Workflow components may then be processed by rendering one or more server pages 510, 514, 518 including the workflow components (e.g., initiation form 512 and/or task form 516) on rich client application 502. A workflow may be executed, one or more workflow components may be reviewed and processed, and workflow status information related to the accessed file (e.g., the accessed item on which the workflow is running) may be displayed.

Opening a file (e.g., accessed file 504 of FIG. 5) in rich client application 502 may begin a file verification process, as described above with reference to verification file 212. Verification file 506 may be compared to accessed file 504 according to one or more verification rules, also as described above. For instance, rich client application 502 may receive instructions to open accessed file 504. Accessed file 504 may be searched to locate workflow associations indicating that accessed file 504 includes one or more workflow component references by comparing accessed file information to verification file 506. Accessed file 504 may be then opened with rich client application 502. Upon verifying that accessed file 504 satisfies the one or more verification rules, verification file 506 may designate a rich client extension server page (e.g., workflow page 510) used to communicate with a server storing one or more workflow components (forms and/or pages). Upon accessing the appropriate pages and/or forms, rich client 502 may display an in-line user interface for managing an available workflow via the rich client application.

Figure 6:
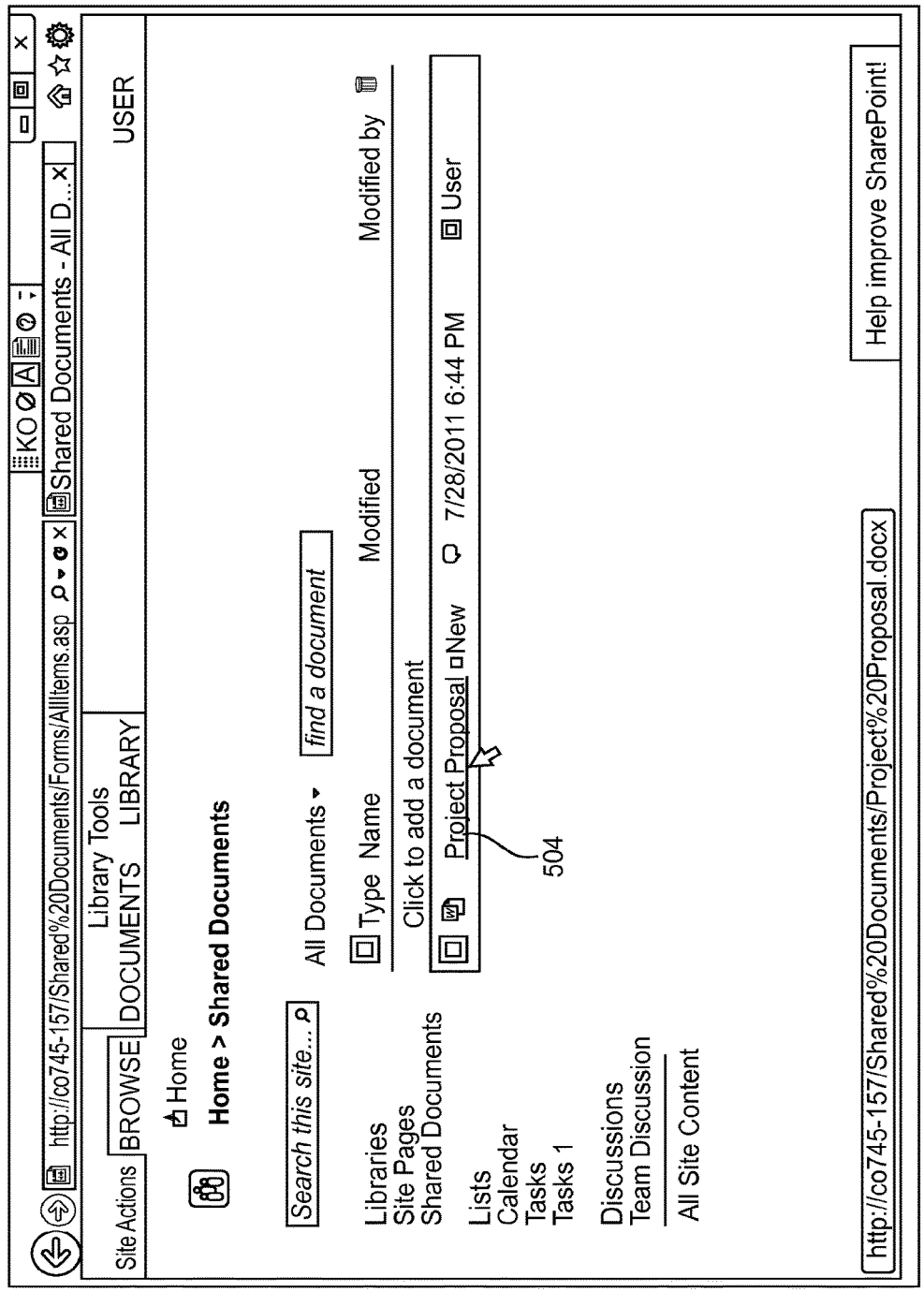
FIG. 6 illustrates a user interface for accessing a workflow item via a shared application platform according to one embodiment.

A rich client application may be instantiated by accessing a file through a shared application platform. FIG. 6 illustrates accessing a workflow item via a shared application platform 600 according to one embodiment. For instance, a workflow item may be selected for processing via a shared application platform (e.g., Microsoft® SharePoint®) in communication with shared application platform server 106 or via the shared application platform server 106 directly. Upon selecting a workflow item, the item may open in a respective rich client (e.g., Microsoft® Word or Microsoft® Excel). As shown in FIG. 6, a link to an accessed file 504 (e.g., "Project Proposal" document) may be selected.

Figure 7:
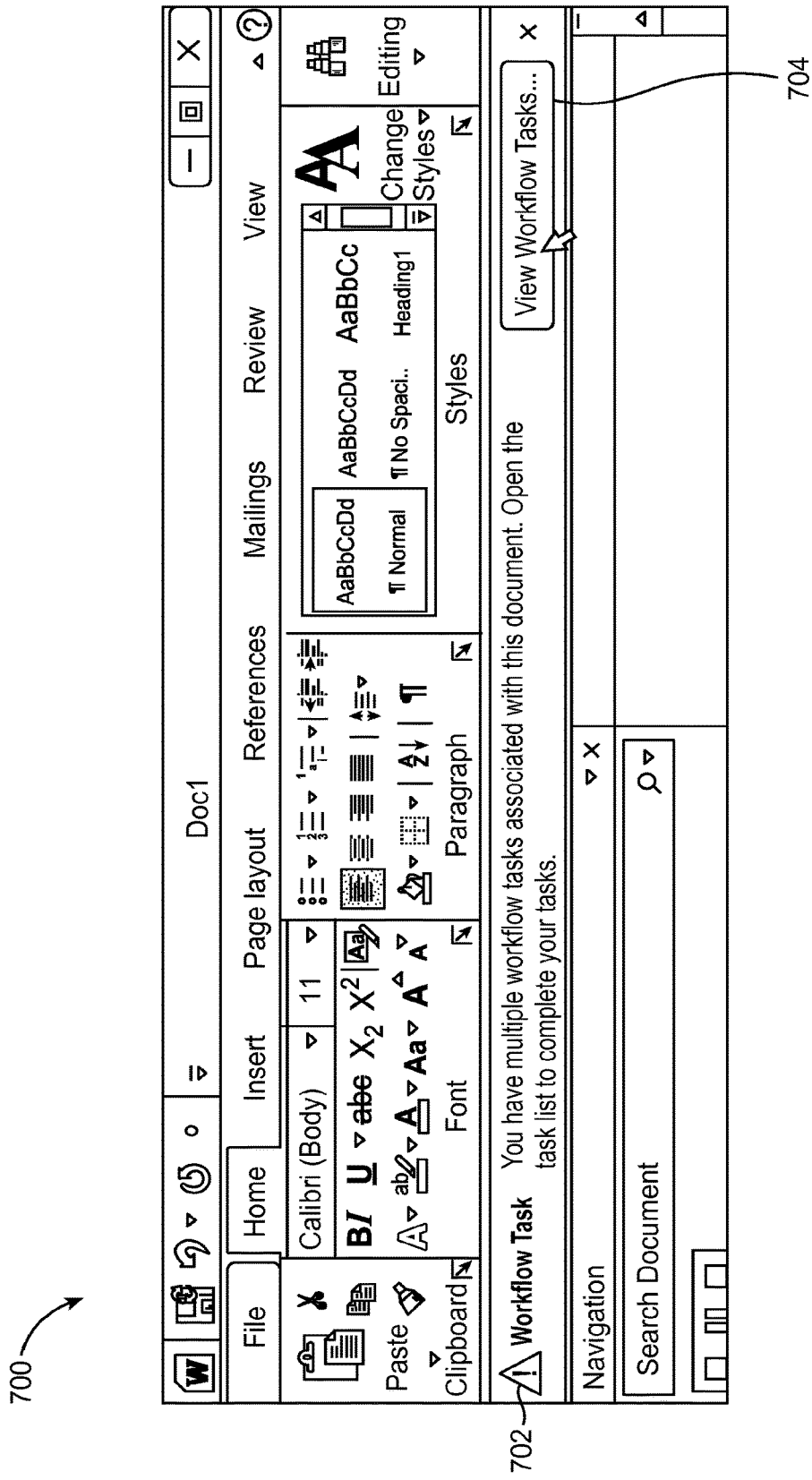
FIG. 7 illustrates a user interface for workflow management via a rich client application according to one embodiment.

Upon opening accessed file 504, rich client application 502 may provide an indication that accessed file 504 includes a workflow component capable of processing via the rich client application. FIG. 7 illustrates a rich client application user interface 700 providing a workflow management indication. A workflow management message 702 may appear (e.g., "You have multiple workflow tasks associated with this document"). Rich client application may provide an actuatable workflow management icon 704, which, when actuated, provides for viewing and processing a workflow component.

Figure 8A:
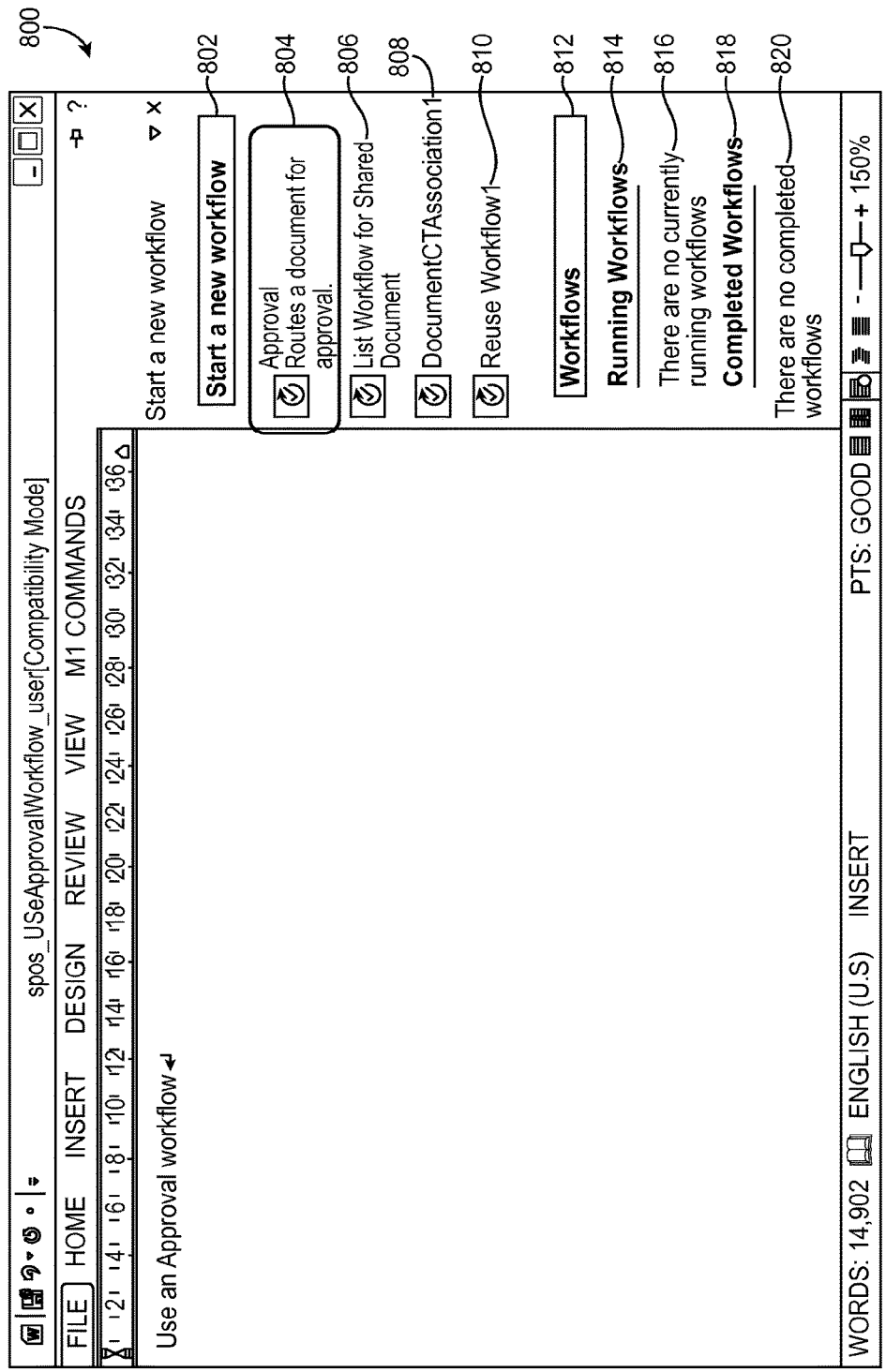
FIGS. 8A-8C illustrate user interfaces for workflow management via a rich client application according to one embodiment.
Figure 8B:
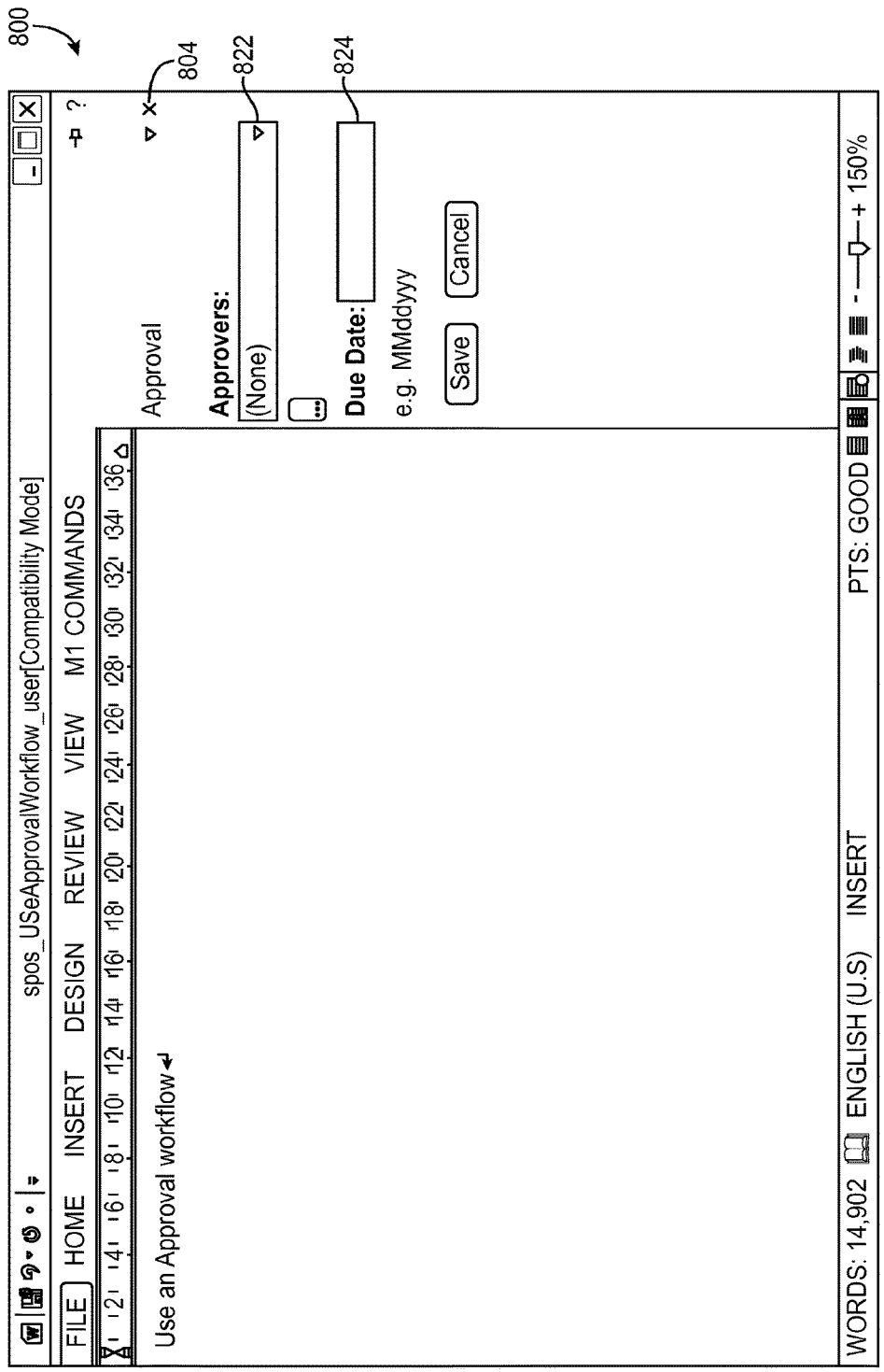
Figure 8C:
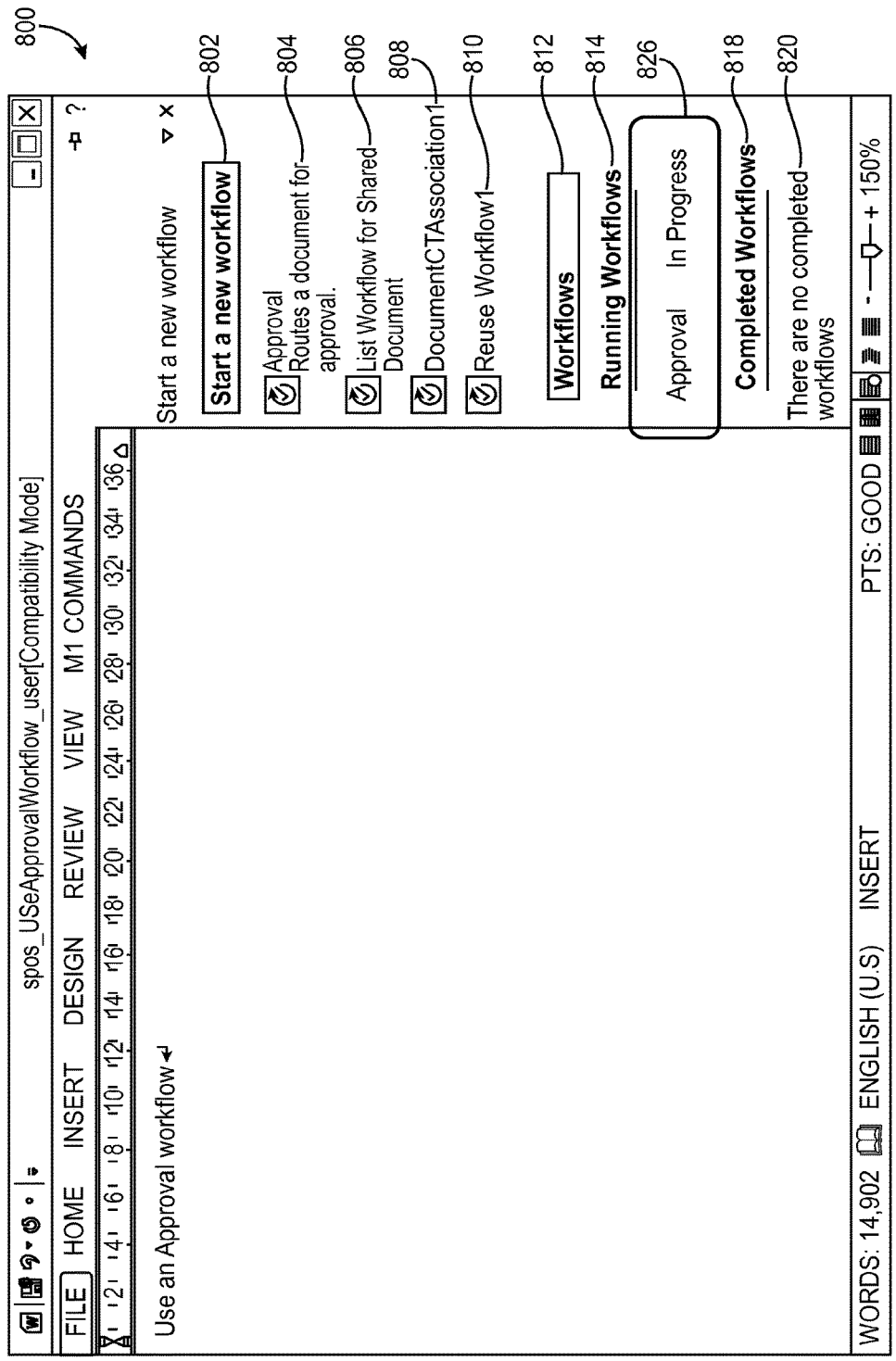

Upon selection of the workflow management icon 704, an in-line workflow management user interface may display along with the workflow component (e.g., accessed file 504) on which the workflow is running FIGS. 8A-8C and 9A-9C illustrate workflow management via a rich client application user interface 800, 900 according to one embodiment. FIGS. 8A-8C illustrate a rich client user interface 800 further including an in-line workflow management user interface within a document processing application. In FIGS. 8A-8C, an in-line workflow management user interface is shown within a document processing rich client application. As shown in FIG. 8A, workflow management user interface (e.g., Start a new workflow" interface 802) may display one or more available workflows for the accessed file, and may also display one or more selectable options for processing a workflow or workflow item (e.g., accessed file 504) in-line with an accessed file. Interface 802 may display any workflow component processing options suitable for processing the workflow component. In some embodiments, workflow management user interface 802 may display an Approval selection 804, a List Workflow selection 806, a Document Association selection 808 and a Reuse Workflow selection 810. Workflow management user interface 802 may also display a workflow status (e.g., "Workflows" 812 status bar indicating providing a status for "Running Workflows" 814: "There are no currently running workflows" 816 and "Completed Workflows" 818: "There are no completed workflows" 820 of FIG. 8A). As shown in FIG. 8B, upon selection of a workflow management option (e.g., Approval selection 804), a menu of approval options such as selecting an approver 822 and/or a due date 824 may display. As shown in FIG. 8C, upon selecting one or more approval options, a workflow status may display a status for the workflow (e.g., under "Running Workflows", status may display as Approval—In Progress 826). Modifications made to the workflow within the rich client application may update the workflow in real-time. Modifications may be made to the workflow (e.g., approve/reject document) or to the document, and any modifications to the workflow made within the rich client may be saved to server 522. The above described workflow component processing options and their respective formats and/or layouts are described as examples only, and are in no way limiting. Additional workflow management options may display, depending on how an available workflow is implemented (e.g., how one or more workflows forms are designed and/or how one or more workflow fields are defined). In some embodiments, interface 802 may include similar workflow component processing features as illustrated in FIG. 9 (e.g., Start" 908, "Tasks" 910, and "Running" 912 selections), and vice versa.

Figure 9A:
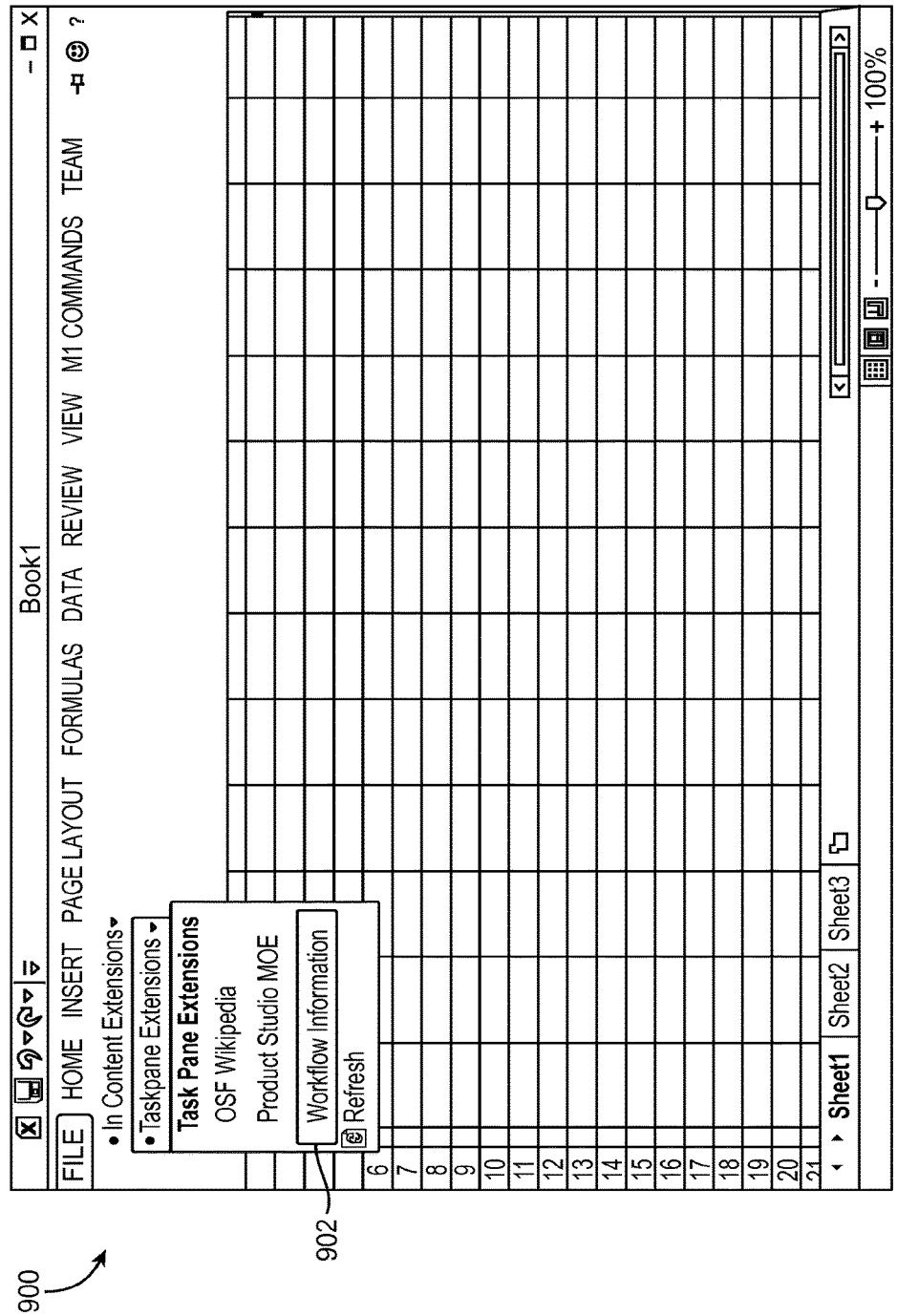
FIGS. 9A-9C illustrate user interfaces for workflow management via a rich client application according to one embodiment.
Figure 9B:
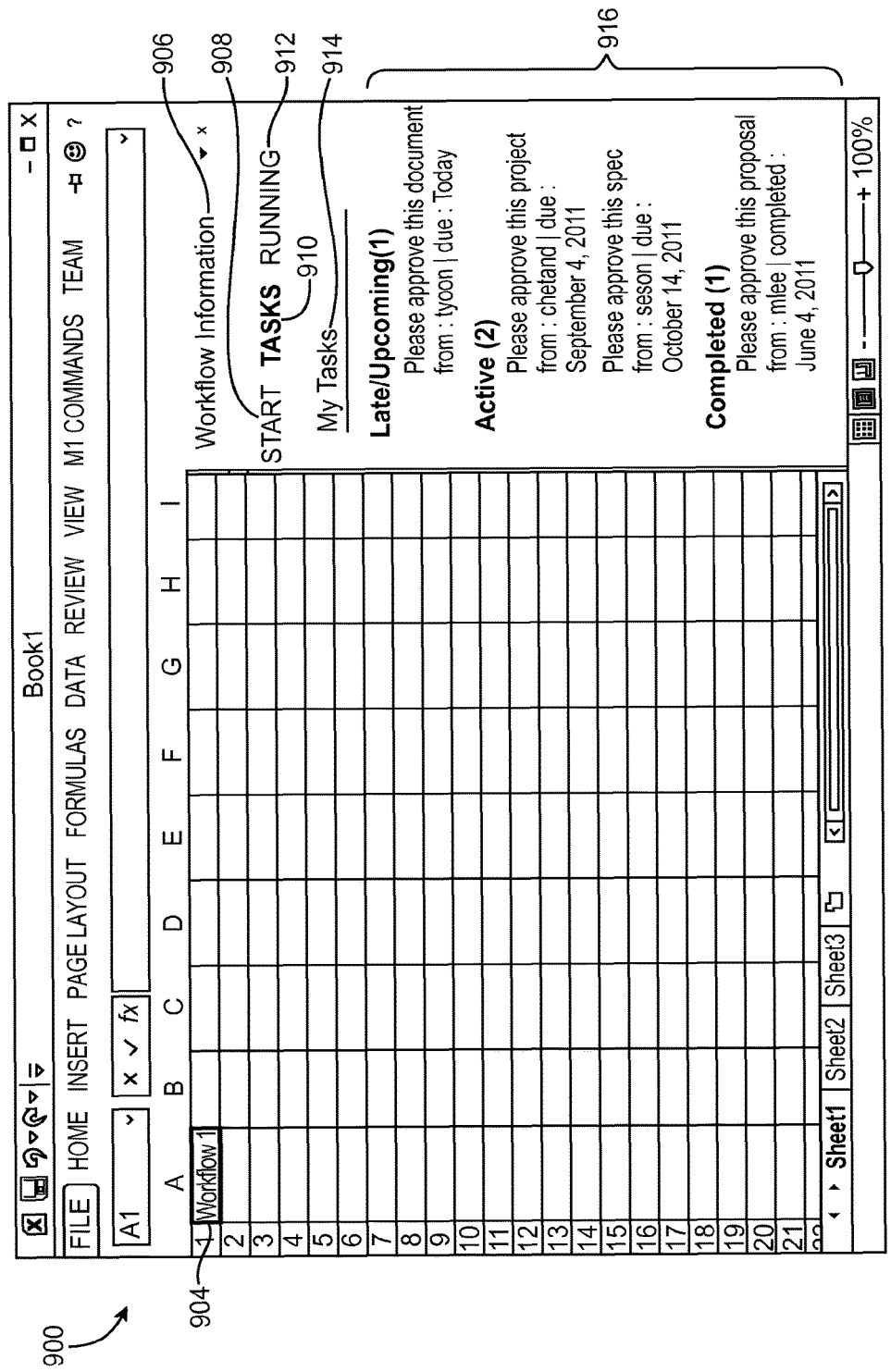
Figure 9C:
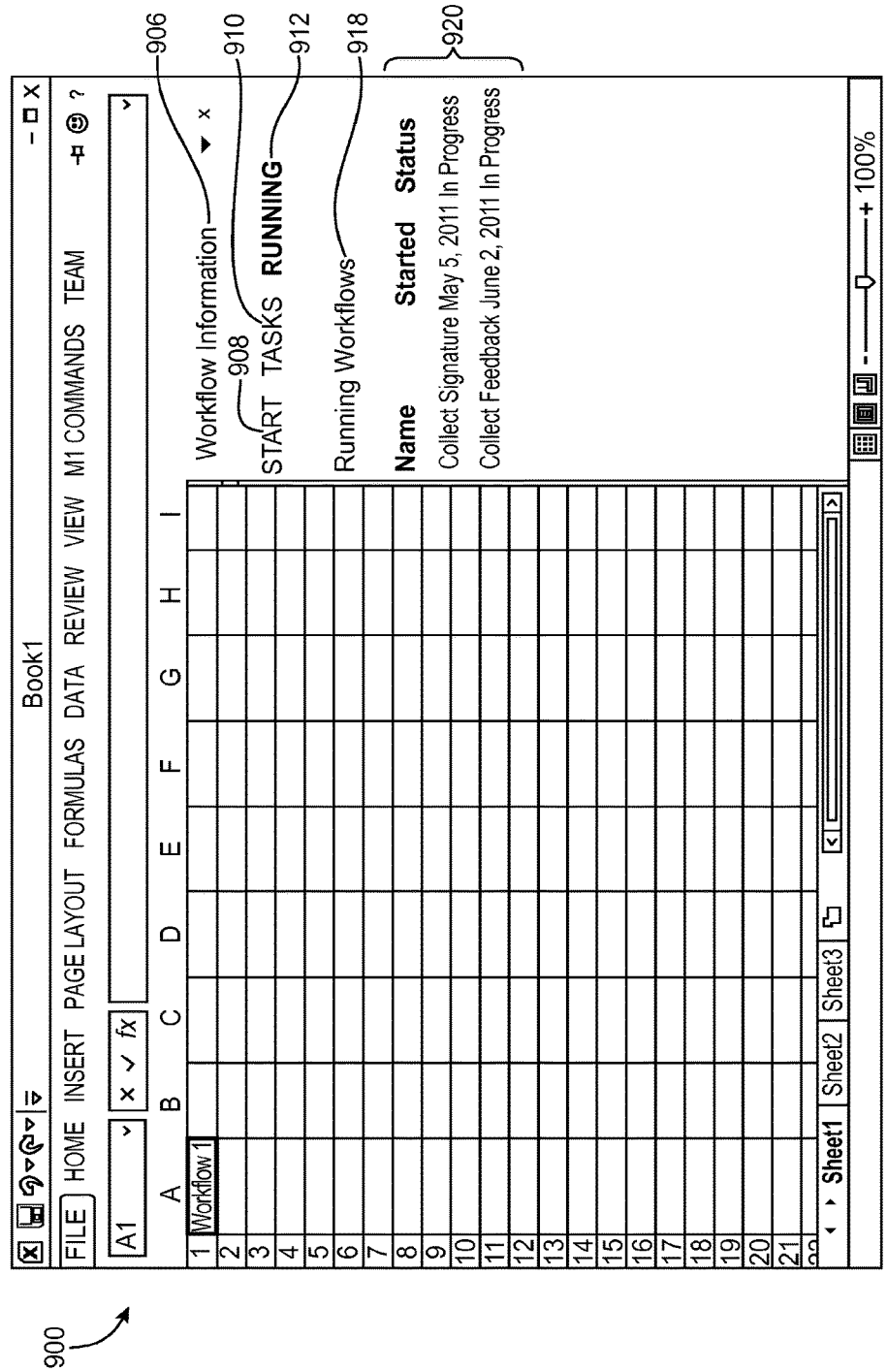

FIGS. 9A-9C illustrate a workflow management user interface within a spreadsheet processing application. As shown in FIG. 9A, rich client user interface 900 may display one or more selectable options for processing a workflow or workflow item (e.g., the opened document) in, for example, Task Pane drop down menu. As shown in FIG. 9A, "Workflow Information" 902 may be selected from rich client user interface. As described above with respect to FIGS. 8A-8C, rich client user interface 900 may also include an entry point for manually activating the workflow management extension. Upon receiving "Workflow Information" 902 selection, a workflow management user interface 906 may display within the rich client user interface. Workflow management user interface 906 may also display one or more workflow management selection options (e.g., "Start" 908, "Tasks" 910, and "Running" 912 selections). Upon receiving a workflow management selection (e.g., "Tasks" 910 selection as shown in FIG. 9B), workflow management user interface 906 may display one or more tasks associated with the opened workflow item (e.g., "My Tasks" 914 shows tasks associated with the spreadsheet that is open in the rich client spreadsheet application) as well as detailed task information 916. The workflow task may then be reviewed and processed within rich client application user interface 900. Detailed task information 916 may be selectable to process a workflow task. As shown in FIG. 9C, rich client user interface 900 may also display workflow status information (e.g., upon selection of workflow status option "Running" 912). Workflow management user interface 906 may display a list of running workflows in Running Workflow list 918 and respective statuses 920 of running workflows. Modifications may be made to the workflow (e.g., approve/reject document) or to the document within the rich client and may be saved to server, such as server 522. Modifications made to a workflow within the rich client application may update the workflow in real-time.

The rich client application user interface may also include an interface (not shown) for signing a workflow item (e.g., document) within the rich client application. For instance, a workflow item may be a lease requiring review and/or approval by a manager. A manager may review the lease and a workflow management interface within the client application may provide a signature portion configured to receive a signature (e.g., an electronic or digital signature). The received signature may be saved to the workflow.

Figure 10:
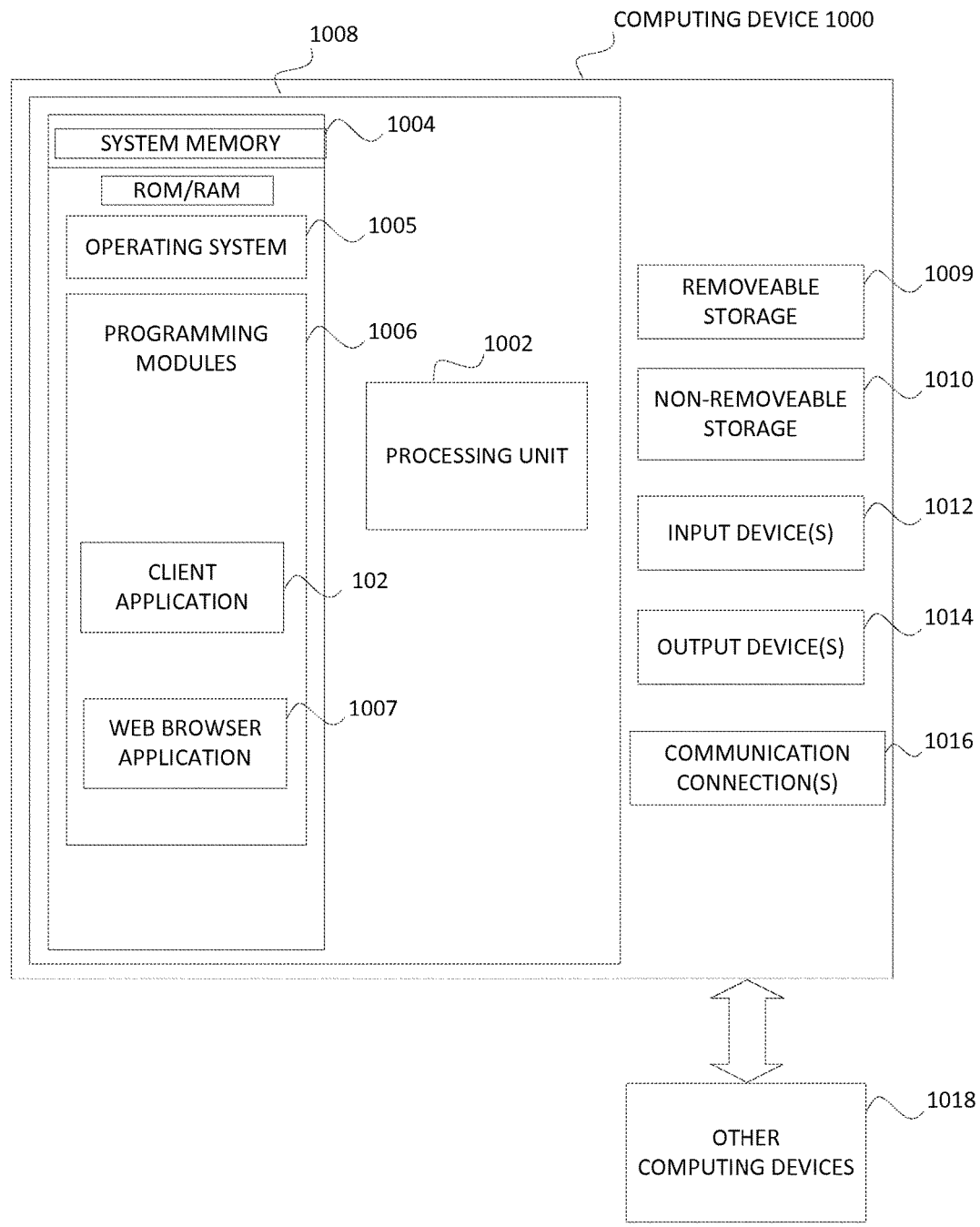
FIG. 10 is a simplified block diagram of a computing system in which embodiments of the present invention may be practiced.

The embodiments and functionalities described herein may operate via a multitude of computing systems, including wired and wireless computing systems, mobile computing systems (e.g., mobile telephones, tablet or slate type computers, laptop computers, etc.). In addition, the embodiments and functionalities described herein may operate over distributed systems, where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like. FIG. 10 and its associated description provide a discussion of a variety of operating environments in which embodiments may be practiced. However, the devices and systems illustrated and discussed with respect to FIG. 10 are for purposes of example and illustration and are not limiting of a vast number of computing device configurations that may be utilized for practicing embodiments, described herein.

FIG. 10 is a block diagram illustrating example physical components of a computing device 1000 with which embodiments may be practiced. In a basic configuration, computing device 1000 may include at least one processing unit 1002 and a system memory 1004. Depending on the configuration and type of computing device, system memory 1004 may comprise, but is not limited to, volatile (e.g. random access memory (RAM)), non-volatile (e.g. read-only memory (ROM)), flash memory, or any combination. System memory 1004 may include operating system 1005 and one or more programming modules 1006. Operating system 1005, for example, may be suitable for controlling the operation of computing device 1000. Furthermore, embodiments may be practiced in conjunction with a graphics library, other operating systems, or any other application program and is not limited to any particular application or system. This basic configuration is illustrated in FIG. 10 by those components within a dashed line 1008.

Computing device 1000 may have additional features or functionality. For example, computing device 1000 may also include additional data storage devices (removable and/or non-removable) such as, for example, magnetic disks, optical disks, or tape. Such additional storage is illustrated in FIG. 10 by a removable storage 1009 and a non-removable storage 1010.

As stated above, a number of program modules and data files may be stored in system memory 1004, including operating system 1005. While executing on processing unit 1002, programming modules 1006 may perform processes including, for example, one or more of the processes described above with reference to FIGS. 1-9. The aforementioned processes are an example, and processing unit 1002 may perform other processes. Other programming modules that may be used in accordance with embodiments may include client application 102, such as electronic mail and contacts applications, word processing applications, spreadsheet applications, database applications, slide presentation applications, drawing or computer-aided application programs, etc.

Generally, consistent with embodiments, program modules may include routines, programs, components, data structures, and other types of structures that may perform particular tasks or that may implement particular abstract data types. Moreover, embodiments may be practiced with other computer system configurations, including hand-held devices, multiprocessor systems, microprocessor-based or programmable consumer electronics, minicomputers, mainframe computers, and the like. Embodiments may also be practiced in distributed computing environments where tasks are performed by remote processing devices that are linked through a communications network. In a distributed computing environment, program modules may be located in both local and remote memory storage devices.

Furthermore, embodiments may be practiced in an electrical circuit comprising discrete electronic elements, packaged or integrated electronic chips containing logic gates, a circuit utilizing a microprocessor, or on a single chip containing electronic elements or microprocessors. For example, embodiments may be practiced via a system-on-a-chip (SOC) where each or many of the components illustrated in FIG. 10 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein may be operated via application-specific logic integrated with other components of the computing device/system 1000 on the single integrated circuit (chip). Embodiments may also be practiced using other technologies capable of performing logical operations such as, for example, AND, OR, and NOT, including but not limited to mechanical, optical, fluidic, and quantum technologies. In addition, embodiments may be practiced within a general purpose computer or in any other circuits or systems.

Embodiments, for example, may be implemented as a computer process (method), a computing system, or as an article of manufacture, such as a computer program product or computer-readable storage medium. The computer program product may be a computer-readable storage medium readable by a computer system and encoding a computer program of instructions for executing a computer process.

The term computer-readable storage medium as used herein may include computer storage media. Computer storage media may include volatile and nonvolatile, removable and non-removable media implemented in any method or technology for storage of information, such as computer-readable instructions, data structures, program modules, or other data. System memory 1004, removable storage 1009, and non-removable storage 1010 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1000. Any such computer storage media may be part of device 1000. Computing device 1000 may also have input device(s) 1012 such as a keyboard, a mouse, a pen, a sound input device, a touch input device, etc. Output device(s) such as a display, speakers, a printer, etc. may also be included. The aforementioned devices are examples and others may be used.

Communication media may be embodied by computer-readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Embodiments herein may be used in connection with mobile computing devices alone or in combination with any number of computer systems, such as in desktop environments, laptop or notebook computer systems, multiprocessor systems, micro-processor based or programmable consumer electronics, network PCs, mini computers, main frame computers and the like. Embodiments may also be practiced in distributed computing environments where tasks are performed by remote processing devices that are linked through a communications network in a distributed computing environment; programs may be located in both local and remote memory storage devices. To summarize, any computer system having a plurality of environment sensors, a plurality of output elements to provide notifications to a user and a plurality of notification event types may incorporate embodiments.

Embodiments, for example, are described above with reference to block diagrams and/or operational illustrations of methods, systems, and computer program products according to embodiments. The functions/acts noted in the blocks may occur out of the order as shown in any flowchart or described herein with reference to FIGS. 1-8. For example, two processes shown or described in succession may in fact be executed substantially concurrently or the blocks may sometimes be executed in the reverse order, depending upon the functionality/acts involved.

While certain embodiments have been described, other embodiments may exist. Furthermore, although embodiments have been described as being associated with data stored in memory and other storage mediums, data can also be stored on or read from other types of computer-readable storage media, such as secondary storage devices, like hard disks, floppy disks, a CD-ROM, or other forms of RAM or ROM. Further, the disclosed processes may be modified in any manner, including by reordering and/or inserting or deleting a step or process, without departing from the embodiments.

It will be apparent to those skilled in the art that various modifications or variations may be made to embodiments without departing from the scope or spirit. Other embodiments are apparent to those skilled in the art from consideration of the specification and practice of the embodiments disclosed herein.

What is claimed:

1. A method for providing client application integration for workflow management comprising:
    accessing, at a processing device, a verification rule;
    parsing a notification file, wherein the notification file comprises data, and wherein parsing the notification file comprises an evaluation of at least one of a header or a body of the notification file using the verification rule to determine whether the notification file includes a workflow component reference;
    identifying a portion of the data as a workflow component reference within the data based on the evaluation;
    determining, based on the identified workflow component reference, whether a workflow component should be activated; and
    in response to determining that the workflow component should be activated, establishing a connection with a server device hosting the workflow component based on the identified workflow component reference.

2. The method of claim 1, further comprising displaying the workflow component referenced by the notification file, wherein the displaying comprises displaying at least one selectable workflow management option to manage the workflow component.

3. The method of claim 2, wherein the displaying further comprises displaying the workflow component on at least one of the processing device and a display device connected with the processing device.

4. The method of claim 1, further comprising receiving the verification rule as a verification file from the server device.

5. The method of claim 1, wherein the notification file is received as a message at the processing device.

6. The method of claim 5, wherein the notification file is an e-mail message.

7. The method of claim 4, wherein the verification file is at least one selected from a group consisting of: an application and a manifest file.

8. The method of claim 4, wherein the identifying further comprises:
comparing the data of the notification file to the verification file; and
identifying the workflow component reference within the notification file based on the comparing.

9. The method of claim 1, further comprising displaying the workflow component referenced by the notification file in addition to at least a part of the notification file.

10. A method comprising:
receiving, at a processing device, a verification rule;
determining whether a received notification file includes a workflow component reference by applying the verification rule to evaluate data of the received notification file, wherein applying the verification rule comprises an evaluation of at least one of a header or a body of the received notification file;
when it is determined that the workflow component reference is included in the received notification file, establishing a connection with a server device hosting a workflow component associated with the workflow component reference; and
accessing, by the processing device, the workflow component based on the identified workflow component reference.

11. The method of claim 10, wherein the connection is established through a workflow management extension.

12. The method of claim 10, further comprising displaying the workflow component referenced in the received notification file, wherein the displaying comprises displaying at least one selectable workflow management option to manage the workflow component.

13. The method of claim 12, wherein the displaying further comprises displaying the workflow component on at least one of the client processing device and a display device connected with the client processing device.

14. The method of claim 10, wherein the received notification file is an e-mail message.

15. The method of claim 10, wherein the verification rule is provided as at least a part of at least one selected from a group consisting of: an application and a manifest file.

16. The method of claim 10, further comprising displaying the workflow component in addition to at least a part of the received notification file.

17. A system comprising:
at least one processor; and
a memory operatively connected with the at least one processor, wherein the memory comprises computer-executable instructions, that when executed by the at least one processor, cause the at least one processor to execute operations that comprise:
accessing, at a processing device, a verification rule;
parsing, using the verification rule, a notification file to determine whether a workflow component reference is included in the notification file, wherein parsing the notification file comprises evaluating at least one of a header or a body of the notification file using the verification rule; and
when it is determined that the workflow component reference is included in the notification file, establishing a connection with a server device hosting a workflow component based on the identified workflow component reference.

18. The system of claim 17, wherein the operations further comprise displaying the workflow component referenced in the notification file, wherein the displaying comprises displaying at least one selectable workflow management option to manage the workflow component.

19. The system of claim 17, wherein the notification file is an e-mail message, and wherein the verification is provided as at least a part of at least one selected from a group consisting of: an application and a manifest file.

20. The system of claim 17, wherein the operations further comprise displaying the workflow component referenced by the notification file in addition to at least a part of the notification file.

* * * * *